April 22, 1941.   C. L. WOTTRING   2,239,027
STALK CUTTER
Filed April 8, 1940
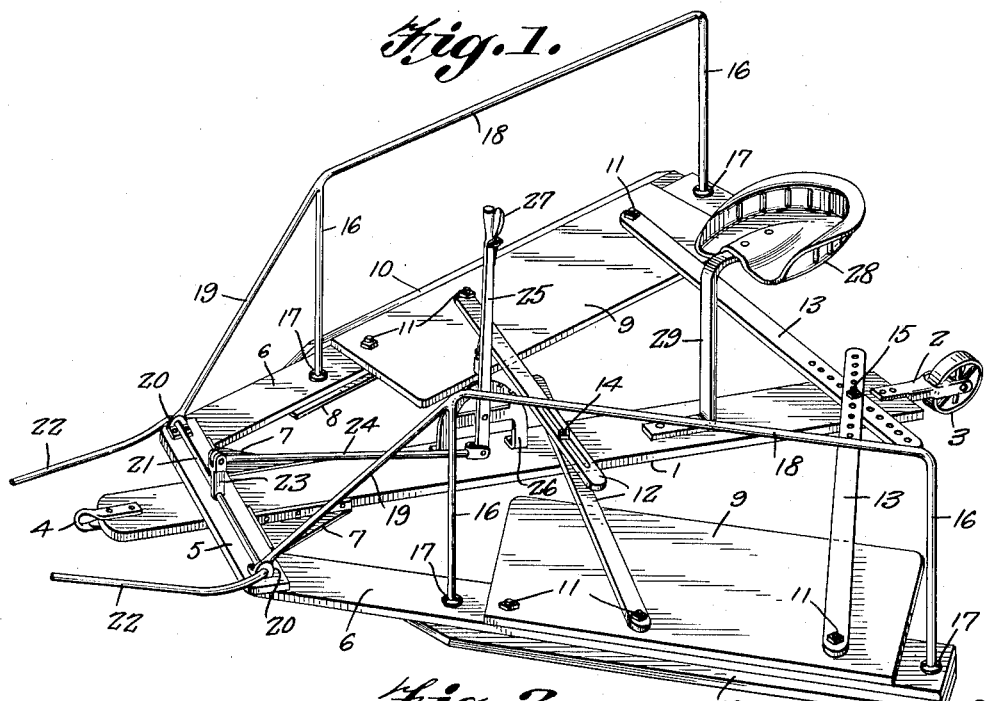
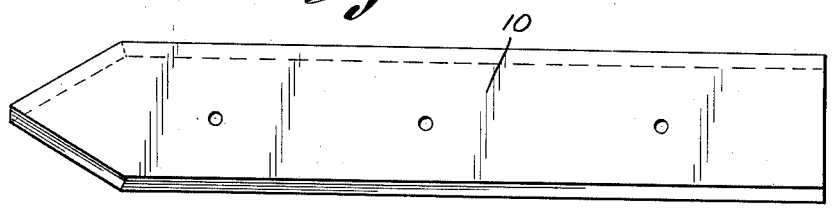
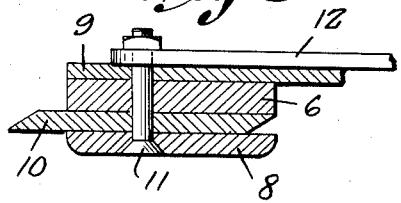   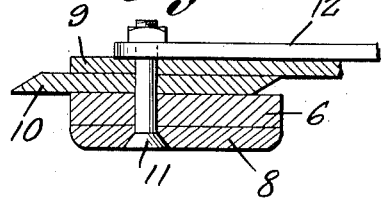
Charles L. Wottring,
INVENTOR
BY Victor J. Evans & Co.
ATTORNEYS Patented Apr. 22, 1941

2,239,027

UNITED STATES PATENT OFFICE 2,239,027

STALK CUTTER

Charles L. Wottring, Houston, Tex.

Application April 8, 1940, Serial No. 328,537

7 Claims. (Cl. 55—60)

This invention relates to stalk cutters, and its general object is to provide a cutter of the sled type that is similar in some respects to the cutter of my Patent No. 1,483,403, dated February 12, 1924, but my improved cutter can be used with greater efficiency on rough and stony ground for cutting cotton stalks and other bushy vegetation, as well as vines, without damage to or premature wear of the blades, as the latter are not only elevated above the ground, but are adjustable to several heights and have double cutting edges so that they can be used for a prolonged period of time without the necessity of sharpening the same.

An important object of my improved cutter is that it can be used with utmost efficiency for cutting corn, sugar cane and other long stalk vegetation, without the latter becoming scattered and broken, as it falls from the blades, as my present cutter includes platforms paralleling the cutting edges of the blades, for attendants to stand upon to catch the stalks as they are cut, so that the cut stalks can be laid down with care, in armload piles, to be subsequently gathered, and it will be obvious that the piling of the stalks materially facilitates the gathering thereof.

A further object is to provide an adjustable stalk cutter that includes a pair of runners, ground engaging shoes, blades and platforms, with the elements of each pair disposed in diverging relation with respect to each other, for the blades to cut two or more rows of vegetation, as the cutter is being drawn between the rows, the number of rows cut depending of course upon the adjustment of the cutter, the size thereof and the space between the rows, and the elements of each pair are arranged in superimposed relation, so that they can be detachably secured together with a minimum number of bolt and nut connections, in that the bolt of each connection extends through each element of a pair and that feature makes it possible to adjust the height of the blades and to dispose either of the cutting edges thereof in use, in an easy and expeditious manner.

Another object is to provide a stalk cutter that includes pickup or lifting means for fallen and bent stalks, as well as stalk guiding and supporting means, and the latter can also be used as hand gripping means by the attendants, if desired.

A still further object is to provide a stalk cutter that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a perspective view of the cutter which forms the subject matter of the present invention.

Figure 2 is a top plan view of one of the blades.

Figure 3 is a fragmentary sectional view illustrating a blade in its lowermost position.

Figure 4 is a similar view with the blade in its uppermost position.

Referring to the drawing in detail, the reference numeral 1 indicates a central beam which is of flat elongated formation and secured to and extending rearwardly from its rear end is a forked attaching bracket 2 for a ground wheel 3 that tends to penetrate the ground and thereby prevents undue lateral movement of the cutter to hold the same properly positioned with respect to the rows, as will be apparent. Secured to the front end of the central beam 1 is a clevis member 4, for connection of draft animals to the cutter or other suitable means, such as a tractor or the like.

Secured to and overlying the forward portion of the central beam 1 is a cross member 5 of a length to extend a considerable distance laterally of the central beam and which has pivotally connected thereto adjacent its ends, the forward ends of a pair of side beams or runners 6. The cross member 5 is preferably secured to the central beam 1 by attaching corner plates 7 of triangular formation and which include flanges bearing against the cross member and the central beam and for receiving suitable securing means such as screw bolts or the like.

Each of the runners is likewise of flat elongated formation and provided with a ground engaging shoe 8 having rounded longitudinal edges as best shown in Figures 3 and 4 and overlying the runners are platforms 9 of greater width than that of the runners to extend a considerable distance inwardly of the inner longitudinal edges thereof to provide ample space for attendants to stand upon, as will be apparent upon inspection of Figure 1, and the outer side longitudinal edges of the platforms are preferably arranged flush with those of the runners.

The cutting blades are indicated by the reference numeral 10 and as best shown in Figure 2, the forward ends of the blades are reduced in V-shaped formation, and the longitudinal edges of the blades are beveled from their upper to their lower surface, in a manner, so that the edges of each blade are inclined in the same direction, as shown in Figures 3 and 4. The blades are of greater width than that of the runners 6, so that the beveled edge portions will extend a considerable distance outwardly beyond the runners for disposal in the path of the stalks to be cut, and by providing the blades with double cutting edges beveled as shown, it will be obvious that either edge can be disposed outermost, consequently it will be seen that the blades can be used for a prolonged period of time without sharpening.

The shoes, runners, blades and platforms of each pair are arranged in superimposed relation and each of those elements have three openings therein in the form shown, and the openings of the elements of each pair are disposed in registration with each other for receiving the bolts of bolt and nut connections 11. By that construction, it will be obvious that the elements of each pair can be readily assembled and disassembled and while they are assembled in a manner whereby the shoes are always lowermost and the platforms are uppermost, the position of the blades may be varied, that is the blades may be disposed between the shoes and the runners, as shown in Figure 3, or between the runners and the platforms as shown in Figure 4, it depending upon the stony condition of the ground, thus it will be seen that the blades can be protected against damage and premature wear.

The runners 6 are pivotally connected to the cross member 5, as previously set forth and extend rearwardly therefrom in diverging relation with respect to each other for the disposal of the cutting blades accordingly, so that when the cutter is drawn through vegetation the cutting edges of the blades will be disposed at an angle to the stalks and thereby readily sever the stalks, without breaking or bending the same. Due to the pivotal connection of the runners with the cross member, they are adjustable with respect to each other, and in order to hold the runners in their various adjusted positions, I provide front and rear strip bars 12 and 13 arranged in pairs, the front bars having their outer ends connected to the intermediate bolt and nut connections 11, while the outer ends of the rear bars are connected to the rearward bolt and nut connections, as clearly shown in Figure 1. The inner portions of each pair of bars are disposed in overlapped engagement and the inner portions of the front bars are longitudinally slotted for receiving the bolt of a bolt and nut connection 14, while the inner portions of the bars 13 are provided with rows of openings for receiving the bolt of a bolt and nut connection 15, the bolts of the connections 14 and 15 extending through the central beam, as shown.

Secured to and rising from each of the runners are the uprights 16 of fenders or stalk guiding and supporting means, the uprights having disk heads 17 secured to the lower ends thereof for receiving screws for fastening the fenders to the runners and extending between the uprights at the upper ends thereof are horizontal portions 18. The fenders are preferably made from tubular members, such as pipe or the like, bent in the form shown, to provide forwardly directed and downwardly inclined forward portions 19 that are welded or otherwise secured to the upper ends of the uprights 16, as clearly shown in Figure 1, and the lower ends of the portions 19 terminate in flat ears 20 of right angle formation with their lower portions inwardly directed and fixed to the cross members 5 adjacent to the ends thereof.

The upper portions of the ears 20 have journaled therein for rocking movement the bight portion 21 of a pickup or lifting means for fallen and bent stalks and which include forwardly directed arms 22 slightly curved upwardly and toward each other. Fixed to the bight portion 21 midway its ends, is a fork member 23 having the forward end of a link rod 24 pivoted between the fork portion thereof while the rear end of the link rod 24 is pivotally connected to the lower end of a hand lever 25 that is provided with a semi-circular rack member 26 fixed to the central beam and rising therefrom. The hand lever is likewise provided with a spring pressed dog actuated by a gripping member 27 and by that construction, it will be obvious that the pickup or lifting means for the stalks can be readily adjusted to various heights and held accordingly.

A driver's seat 28 of the usual construction is fixed to the central beam through the medium of an upright 29.

From the above description and disclosure in the drawing, it is believed that the operation of my improved cutter will be understood, but it might be mentioned that the cutter is driven through the growing vegetation or crops, so that the central beam will be centrally arranged between a pair of rows, for the disposal of the rows in the path of the cutting edges of the blades. An attendant stands on each of the platforms to catch the stalks as they are being cut, so that they can be laid down in armload piles to be subsequently gathered. The arms 22 guide the vegetation toward the forward portions 19 which in turn guide the same to the horizontal or rail portions 18 of the fenders, therefore it will be seen that regardless of the condition of the vegetation and whether it be vines, bushes, stalks or sugar cane, it can be cut in an easy, expeditious and efficient manner by my device.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A stalk cutter comprising a pair of runners, ground engaging shoes underlying the runners, platforms for attendants and overlying the runners, cutting blades between the platforms and the runners, and means for removably securing the shoes, blades, runners and platforms in superimposed relation and with the blades between the shoes and the runners or between the runners and the platforms.

2. A stalk cutter comprising a pair of runners, means having the runners pivotally connected thereto for disposal rearwardly therefrom in diverging relation and for adjustment relative to each other, ground engaging shoes underlying the runners, platforms for attendants and overlying the runners, cutting blades between the platforms and the runners, means for removably securing the shoes, blades, runners and platforms in superimposed relation and with the blades between the shoes and the runners or between the runners and the platforms, and means for securing the runners in various adjusted positions.

3. A stalk cutter comprising a pair of runners, means having the runners pivotally connected thereto for disposal rearwardly therefrom in diverging relation and for adjustment relative to each other, ground engaging shoes underlying the runners, platforms for attendants and overlying the runners, cutting blades between the platforms and the runners, means for removably securing the shoes, blades, runners and platforms in superimposed relation and with the blades between the shoes and the runners or between the runners and the platforms, means for securing the runners in various adjusted positions, and said blades having both longitudinal edges thereof beveled and being wider than the runners for the disposal of either beveled edge portion of the blades outwardly beyond the outer longitudinal edges of the runners.

4. A stalk cutter comprising a pair of runners, means having the runners pivotally connected thereto for disposal rearwardly therefrom in diverging relation and for adjustment relative to each other, ground engaging shoes underlying the runners, platforms for attendants and overlying the runners, cutting blades between the platforms and the runners, means for removably securing the shoes, blades, runners and platforms in superimposed relation and with the blades between the shoes and the runners or between the runners and the platforms, means for securing the runners in various adjusted positions, vegetation supporting fenders secured to and rising from the runners, and means for guiding the vegetation to the upper portions of the fenders upon forward movement of the cutter and extending upwardly at a rearward inclination from the front of the cutter.

5. A stalk cutter comprising a pair of runners, means having the runners pivotally connected thereto for disposal rearwardly therefrom in diverging relation and for adjustment relative to each other, ground engaging shoes underlying the runners, platforms for attendants and overlying the runners, cutting blades between the platforms and the runners, means for removably securing the shoes, blades, runners and platforms in superimposed relation and with the blades between the shoes and the runners or between the runners and the platforms, means for securing the runners in various adjusted positions, vegetation supporting fenders secured to and rising from the runners, means for guiding the vegetation to the upper portions of the fenders upon forward movement of the cutter and extending upwardly at a rearward inclination from the front of the cutter, and adjustable pickup means for directing the vegetation to the guiding means and extending forwardly from the cutter.

6. A stalk cutter comprising a central beam, a ground wheel mounted on the rear end of the beam, clevis means mounted on the front end thereof, cross means secured to the forward portion of the beam and extending laterally thereof, a pair of side beams providing runners and having their forward ends pivotally connected to the outer ends of the cross means for disposal rearwardly therefrom in diverging relation and for adjustment relative to each other, ground engaging shoes underlying the runners, platforms for attendants and overlying the runners, cutting blades between the platforms and the runners, means for removably securing the shoes, blades, runners and platforms in superimposed relation and with the blades between the shoes and the runners or between the runners and the platforms, said blades having both longitudinal edges thereof beveled and being wider than the runners for disposal of either beveled edge portion of the blades outwardly beyond the outer longitudinal edges of the runners, means arranged in pairs and having their outer ends connected to said removable securing means and their inner ends to the central beam for securing the runners in various adjusted positions, and seating means secured to and rising from the central beam.

7. A stalk cutter comprising a central beam, a ground wheel mounted on the rear end of the beam, clevis means mounted on the forward end thereof, cross means secured to the forward portion of the beam and extending laterally therefrom, a pair of side beams providing runners having their forward ends pivotally connected to the outer ends of the cross means for disposal rearwardly thereof in diverging relation and for adjustment relative to each other, means connected to the runners and the cross beam for securing the runners in various adjusted positions, cutting blades underlying the runners and carried thereby, platforms for attendants and carried by the runners, vegetation supporting fenders secured to and rising from the runners, said fenders including upper horizontal portions paralleling the runners, means guiding the vegetation to the upper horizontal portions upon forward movement of the cutter and extending upwardly at a rearward inclination from the cross means to said upper horizontal portions, ears formed on the forward ends of the guiding means and fixed to the cross means, pickup means including a bight portion journaled in the ears for rocking movement, upwardly and inwardly curved arms formed on the bight portion and extending forwardly therefrom, a hand lever linked to the bight portion for adjusting the height of the pickup means, and means mounted on the beam and the hand lever for holding the pickup means in adjusted positions.

CHARLES L. WOTTRING.